(12) United States Patent
Despotuli

(10) Patent No.: US 9,746,355 B2
(45) Date of Patent: Aug. 29, 2017

(54) SYSTEMS AND METHODS FOR SELECTIVE CONTEXTUAL ILLUMINATION OF DIGITAL INFORMATION DISPLAY DEVICES AND OTHER INFORMATION INDICATION DEVICES

(71) Applicant: Leonid Despotuli, Chernogolovka (RU)

(72) Inventor: Leonid Despotuli, Chernogolovka (RU)

(*) Notice: Subject to any disclaimer, the term of this patent is extended or adjusted under 35 U.S.C. 154(b) by 0 days.

(21) Appl. No.: 14/548,334

(22) Filed: Nov. 20, 2014

(65) Prior Publication Data
US 2016/0146644 A1    May 26, 2016

(51) Int. Cl.
*B60Q 3/00* (2017.01)
*G01D 11/28* (2006.01)
*B60Q 3/12* (2017.01)
*B60Q 3/10* (2017.01)
*G01D 13/26* (2006.01)

(52) U.S. Cl.
CPC ............ *G01D 11/28* (2013.01); *B60Q 3/10* (2017.02); *B60Q 3/12* (2017.02); *G01D 13/265* (2013.01)

(58) Field of Classification Search
CPC ........ B60K 2350/206; B60K 2350/408; B60K 2350/203; B60K 2350/2065; B60K 2350/2069; B60K 2350/2008; B60K 2350/402; B60K 2350/2013; B60K 2350/1064; B60Q 3/10; B60Q 3/12; B60Q 3/14
See application file for complete search history.

(56) References Cited

U.S. PATENT DOCUMENTS

| | | | | |
|---|---|---|---|---|
| 5,487,303 A * | 1/1996 | Li | ............ | B60K 35/00 340/441 |
| 6,729,738 B2 * | 5/2004 | Fuwausa | ............ | B60K 35/00 250/461.1 |
| 7,940,604 B2 * | 5/2011 | Inoue | ............ | B60K 37/02 368/223 |
| 2002/0176245 A1 * | 11/2002 | Fuwausa | ............ | B60K 35/00 362/84 |
| 2005/0280521 A1 * | 12/2005 | Mizumaki | ............ | B60K 35/00 340/438 |
| 2007/0126567 A1 * | 6/2007 | Fournier | ............ | B60K 37/02 340/461 |
| 2008/0151700 A1 * | 6/2008 | Inoue | ............ | B60K 37/02 368/80 |
| 2009/0173271 A1 * | 7/2009 | Sigg | ............ | G01D 11/28 116/288 |
| 2013/0100164 A1 * | 4/2013 | Oishi | ............ | B60K 35/00 345/629 |

* cited by examiner

*Primary Examiner* — Van Trieu
(74) *Attorney, Agent, or Firm* — TransPacific Law Group; Pavel I. Pogodin, Esq.

(57) ABSTRACT

An information indication system for a vehicle, a vessel, an aircraft as well as other equipment, the information indication system configured to indicate a value of a physical parameter to an operator of the vehicle, vessel or aircraft, the information indication system including a dial corresponding to a range of values of the physical parameter and a needle operable to move about the dial, wherein a current location of the needle on the dial indicates the value of a physical parameter within the range of values of the physical parameter, wherein the information indication system is configured to illuminate a portion of the dial in the immediate vicinity of the current location of the needle on the dial. In various embodiments, the information indication system may be a speedometer or a tachometer.

15 Claims, 3 Drawing Sheets

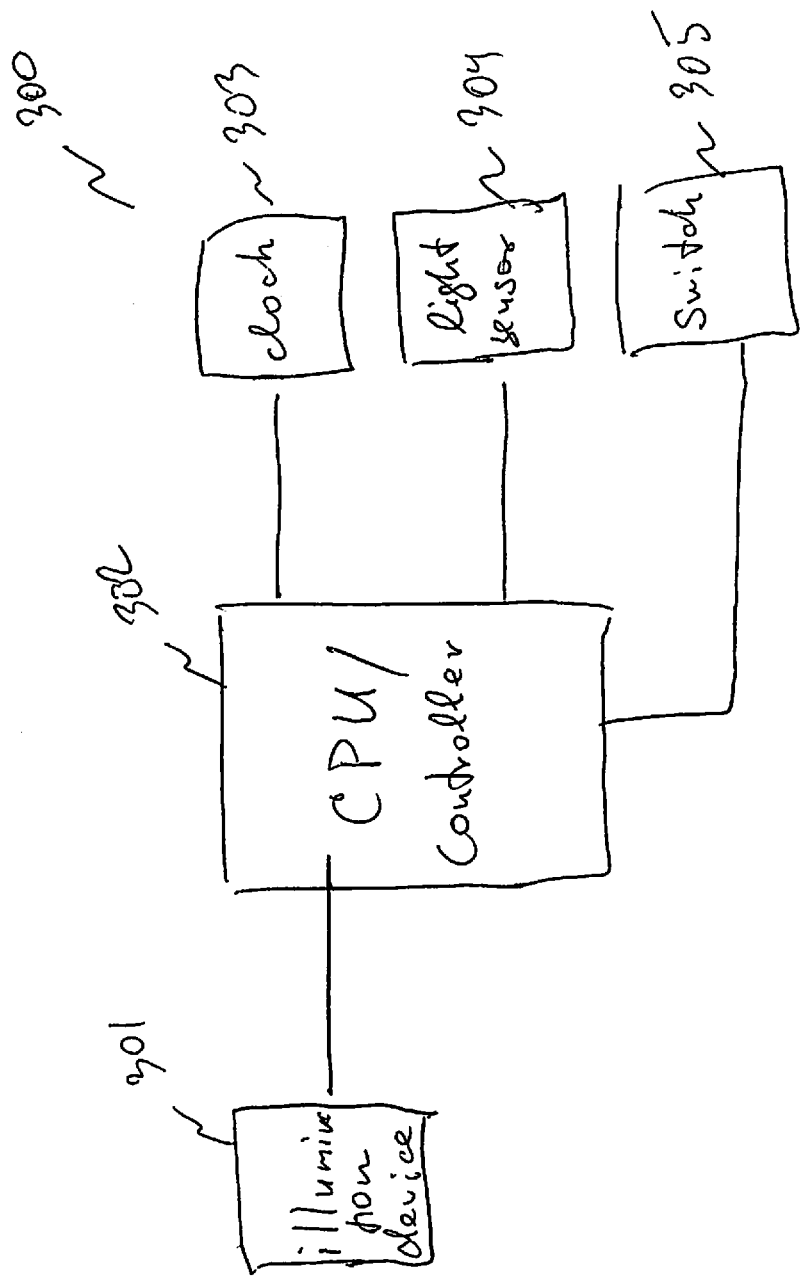

SYSTEMS AND METHODS FOR SELECTIVE CONTEXTUAL ILLUMINATION OF DIGITAL INFORMATION DISPLAY DEVICES AND OTHER INFORMATION INDICATION DEVICES

BACKGROUND OF THE INVENTION

Technical Field

The described techniques relate to technologies for vehicle, vessel, aircraft as well as other applications and, more specifically, to a system and method for selective contextual illumination of digital information display devices and other informational indicators in vehicles, vessels, aircraft as well as other equipment.

Description of the Related Art

Especially during the night operations, the total amount of light emitted by display devices of a control system of vehicles, vessels and aircraft may adversely effect the night vision capabilities of the eyes of the operator. Therefore, it is desirable to reduce such total light output, while still providing the operator the required information. The need for reducing light output may be especially important during low ambient light operations and during critical phases, such as takeoff and landing of the aircraft or docking of a vessel.

In addition, in many cases, the digital information display devices and other indication devices used in vehicles, vessels and aircraft provide much additional information, not essential for the current state of the operation of the corresponding machinery. Because of this, the operator may get distracted by this additional non-essential information and overlook some information critical for the operation. Therefore, it may be desirable to reduce the amount of information displayed to the user, especially during the aforesaid critical phases of the operation.

Therefore, new systems and methods for providing information to the operators of vehicles, vessels and aircraft are needed, including those that reduce the total light output and the total amount of non-essential information shown to the operator, especially in low light conditions and during critical phases of the operation.

SUMMARY OF THE INVENTION

The inventive methodology is directed to methods and systems that substantially obviate one or more of the above and other problems associated with conventional techniques for providing information to operators of vehicles, vessels and aircraft.

In accordance with one aspect of the techniques described herein, there is provided an information indication system for a vehicle, a vessel or an aircraft, the information indication system configured to indicate a value of a physical parameter to an operator of the vehicle, vessel or aircraft, the information indication system comprising a dial corresponding to a range of values of the physical parameter and a needle operable to move about the dial, wherein a current location of the needle on the dial indicates the value of a physical parameter within the range of values of the physical parameter, wherein the information indication system is configured to illuminate a portion of the dial in the immediate vicinity of the current location of the needle on the dial.

In one or more embodiments, the illumination of the portion of the dial in the immediate vicinity of the current location of the needle on the dial is performed using a light source configured to move together with the needle.

In one or more embodiments, the light source is an LED.

In one or more embodiments, the light source is an LED mechanically attached to the needle.

In one or more embodiments, the information indication system is a speedometer of the vehicle, vessel or aircraft.

In one or more embodiments, the information indication system is a tachometer of the vehicle, vessel or aircraft.

In one or more embodiments, the illumination is an additional illumination, in addition to a base illumination of the dial.

In one or more embodiments, a color of the illumination is different from a color of a base illumination of the dial.

In one or more embodiments, the needle is illuminated together with the portion of the dial in the immediate vicinity of the current location of the needle on the dial.

In accordance with another aspect of the techniques described herein, there is provided an information indication system for a vehicle, a vessel or an aircraft, the information indication system configured to indicate a value of a physical parameter to an operator of the vehicle, vessel or aircraft, the information indication system comprising a digital display device displaying a dial corresponding to a range of values of the physical parameter and a needle located on the dial, wherein a current location of the needle on the dial indicates the value of a physical parameter within the range of values of the physical parameter, wherein the information indication system is configured to increase a brightness of a portion of the dial displayed in the immediate vicinity of the current location of the displayed needle on the dial.

In one or more embodiments, the digital display device is an LCD panel.

In one or more embodiments, the information indication system is a speedometer of the vehicle, vessel or aircraft.

In one or more embodiments, the information indication system is a tachometer of the vehicle, vessel or aircraft.

In one or more embodiments, a color of the portion of the dial displayed in the immediate vicinity of the current location of the displayed needle on the dial is different from a color of a remainder of the dial.

In one or more embodiments, a color of the displayed needle and the portion of the dial displayed in the immediate vicinity of the current location of the displayed needle on the dial is different from a color of a remainder of the dial.

In accordance with yet another aspect of the techniques described herein, there is provided a vehicle, a vessel or an aircraft comprising an information indication system configured to indicate a value of a physical parameter to an operator of the vehicle, vessel or aircraft, the information indication system comprising a dial corresponding to a range of values of the physical parameter and a needle operable to move about the dial, wherein a current location of the needle on the dial indicates the value of a physical parameter within the range of values of the physical parameter, wherein the information indication system is configured to illuminate a portion of the dial in the immediate vicinity of the current location of the needle on the dial.

In one or more embodiments, the illumination of the portion of the dial in the immediate vicinity of the current location of the needle on the dial is performed using a light source configured to move together with the needle.

In one or more embodiments, the light source is an LED.

In one or more embodiments, the light source is an LED mechanically attached to the needle.

In one or more embodiments, the information indication system is a speedometer of the vehicle, vessel or aircraft.

In one or more embodiments, the information indication system is a tachometer of the vehicle, vessel or aircraft.

In one or more embodiments, the illumination is an additional illumination, in addition to a base illumination of the dial.

In one or more embodiments, a color of the illumination is different from a color of a base illumination of the dial.

In one or more embodiments, the needle is illuminated together with the portion of the dial in the immediate vicinity of the current location of the needle on the dial.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 3 illustrates an exemplary embodiment of a control system for an information indication system for providing selective illumination capability in order to reduce the total light output and the total amount of non-essential information shown to the operator.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Various embodiments of the invention relate to systems and methods for providing information to the operators of vehicles, vessels, aircraft as well as other equipment are needed, including those that reduce the total light output and the total amount of non-essential information shown to the operator, especially in low light conditions and during critical phases of the operation. Specifically, in accordance with one or more embodiments of the invention, there is provided a display system for vehicles, vessels, aircraft as well as other equipment, which is configured to provide selective illumination capability in order to reduce the total light output and the total amount of non-essential information shown to the operator.

Figure 1:
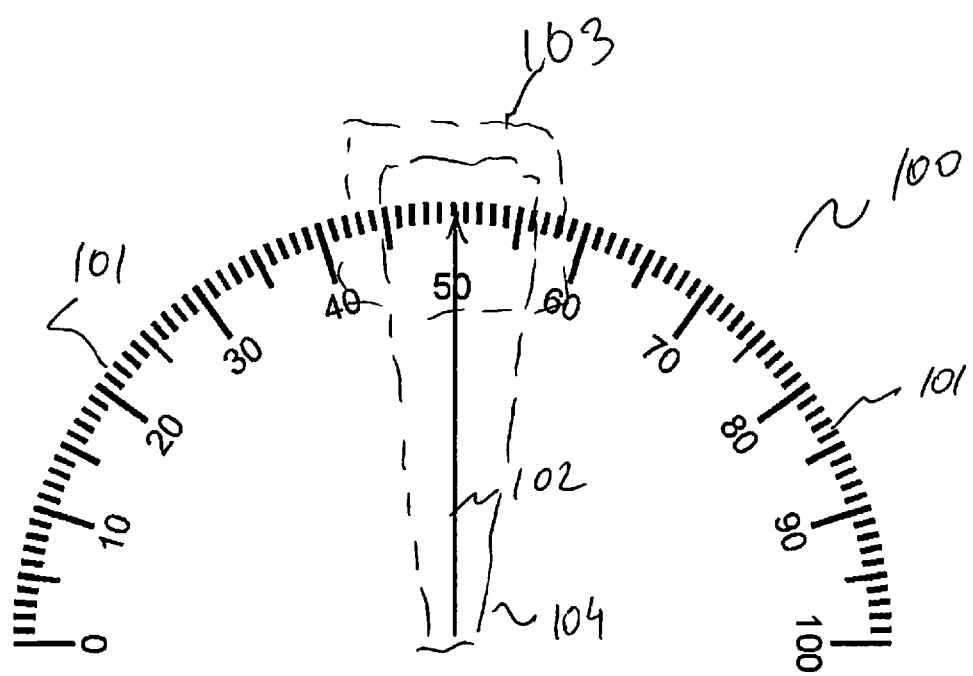
FIG. 1 illustrates an exemplary embodiment of an information indication system for providing selective illumination capability in order to reduce the total light output and the total amount of non-essential information shown to the operator.

FIG. 1 illustrates an exemplary embodiment of an information indication system 100 for providing selective illumination capability in order to reduce the total light output and the total amount of non-essential information shown to the operator. As shown in FIG. 1, the information indication system 100 includes an instrument scale or dial 101 and a needle (indicator) 102. In accordance with one or more embodiments, the information indication system 100 is configured to provide illumination or additional illumination of a portion of the instrument scale or dial 101 in the immediate vicinity of the current position of the needle 102. One exemplary embodiment of the portion of the instrument scale or dial 101 receiving the illumination or additional illumination is indicated in FIG. 1 with numeral 103. Another, alternative configuration of the portion of the instrument scale or dial 101 receiving the illumination or additional illumination is indicated in FIG. 1 with numeral 104. It should be noted that the described concept is not limited to a particular configuration or shape of the illuminated portion and many other shapes of the illuminated portion may be used.

In one or more embodiments, the remaining instrument scale or dial 101 is not illuminated. In an alternative embodiment, the remaining instrument scale or dial 101 is illuminated at lower intensity than the portion 103 or 104.

In one or more embodiments, the aforesaid illumination or additional illumination may be accomplished using one or more light sources moving synchronously with the needle 102. In one or more embodiments, the one or more light sources are light emitting diodes (LEDs) attached to the needle 102. In another embodiment, the aforesaid illumination or additional illumination may be accomplished using one or more light sources positioned behind the dial 101 or the faceplate of the device 100. In one embodiment, an array of light sources may be positioned behind the dial 101, which are selectively illuminated based on the location of the needle 102 in order to provide illumination or additional illumination of a portion of the instrument scale or dial 101 in the immediate vicinity of the current position of the needle 102.

Figure 2:
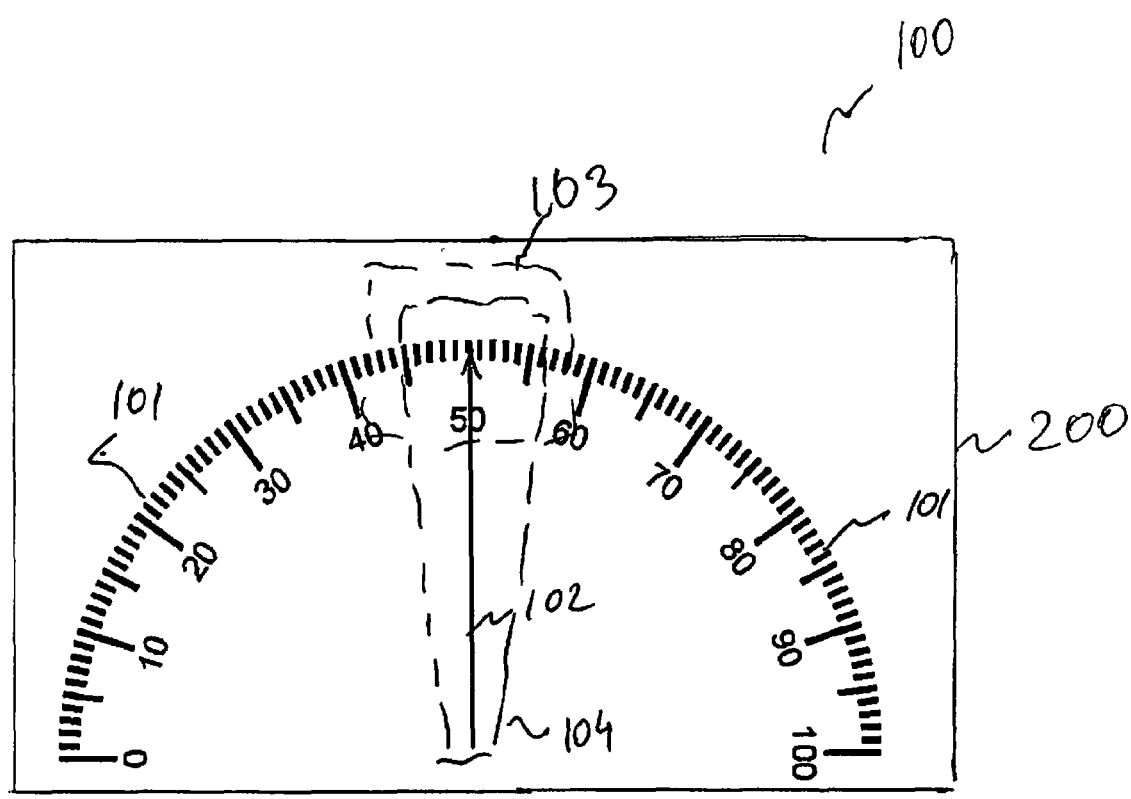
FIG. 2 illustrates another exemplary embodiment of an information indication system for providing selective illumination capability in order to reduce the total light output and the total amount of non-essential information shown to the operator.

In one or more embodiments, the information indication system 100 comprises a digital display device 200, such as a liquid crystal display (LCD) panel or OLED panel, well known to persons of ordinary skill in the art, which is configured to display the instrument scale or dial 101 and the needle 102, see FIG. 2. In this embodiment, the digital display device 200 is configured to increase the brightness of the displayed instrument scale or dial 101 in the area adjacent to the location of the displayed needle 102. Exemplary areas of increased brightness in the vicinity of the location of the needle 102 are designated with numerals 103 and 104.

In one or more embodiments, the information indication system 100 is a speedometer of a vehicle or a vessel or an airspeed indicator of an aircraft. In this embodiment, the needle 102 indicates the current speed on the instrument scale or dial 101. An area of the instrument scale or dial 101 in the immediate proximity of the location of the needle 102 is illuminated (or additionally illuminated). The illuminated area should be large enough to include one or more numbers on the speed instrument scale or dial 101 in the vicinity of the needle 102 to indicate the speed to the user. This enables the operator of the machinery to easily determine the current speed while reducing the total light output and the total amount of non-essential information shown to the operator.

In one or more embodiments, the information indication system 100 is a tachometer of a vehicle, a vessel or an aircraft. In this embodiment, the needle 102 indicates the current rotational speed of an engine on the instrument scale or dial 101. An area of the instrument scale or dial 101 in the immediate proximity of the location of the needle 102 is illuminated (or additionally illuminated). The illuminated area should be large enough to include one or more numbers on the rotational speed instrument scale or dial 101 in the vicinity of the needle 102 to indicate the rotational speed to the user. This enables the operator of the machinery to easily determine the current rotational speed while reducing the total light output and the total amount of non-essential information shown to the operator.

In one or more embodiments, the areas such as 103 or 104, in the vicinity of the location of the needle 102, are illuminated with a light having a color, which is different from the color of the light illuminating of the remainder of the instrument scale or dial 101. For example, the main illumination color may be green, while the additional illumination color may be red.

In one or more embodiments, the areas such as 103 or 104, in the vicinity of the location of the needle 102, as well as the needle 102 itself are illuminated with a light having a color, which is different from the color of the light illuminating of the remainder of the instrument scale or dial 101. For example, the main illumination color may be green, while the additional illumination color may be red.

In one or more embodiments, the information indication system 100 comprises a digital display device 200, such as a liquid crystal display (LCD) panel or OLED panel, well known to persons of ordinary skill in the art, which is configured to display the instrument scale or dial 101 and the needle 102, see FIG. 2. In this embodiment, the areas such as 103 or 104, in the vicinity of the location of the needle 102, are displayed using a color (accent color), which is different from the color used for displaying the remainder of the instrument scale or dial 101. For example, the main display color may be green, while the accent color may be red. In one or more embodiments, the needle 102 may be also displayed using the accent color.

In one or more embodiments, the illumination described above is controlled using a circuit 300 illustrated in FIG. 3. The illumination device 301, which can be one or more LEDs or a digital display device, such as LCD panel is controlled by the CPU/controller 302. The CPU/controller 302 may enable the illumination mode described above based on the time of day obtained from a clock 303. For example, the CPU/controller 302 may be configured to turn on the illumination mode described above during low light hours. In another embodiment, the illumination mode described above may be enable based on reading of the intensity of the ambient light from an ambient light sensor 304. In this example, when the ambient light intensity is below a predetermined threshold, the illumination mode described above is enabled. In yet another embodiment, the CPU/controller 302 may be configured to turn on the illumination mode described above based on user activating a switch or graphical user widget 305. In yet another embodiment, the described illumination mode may be always enabled.

It should be noted that the dial 101 may have a variety of shapes and designs. It should be further noted that the inventive information indication system 100 is not limited only to dial-type information indication system and a variety of other types of information indication systems may be used. For example, the information indication system 100 may be a GPS display displaying a map, wherein a portion of the map in the immediate vicinity of the current location of the machinery, as indicated by a marker, is illuminated and/or displayed and/or color-accented. A variety of other types of information indication systems could also be used in connection with the inventive concepts described herein.

It should be noted that the described information indication system for providing selective illumination capability may be used in connection with any equipment and/or machinery. Therefore, the concepts described herein are not limited to any specific applications. Finally, it should be finally noted that the vehicle functions described herein may be implemented in either hardware or software.

Although the invention has been shown and described with reference to specific embodiments, it is understood that these embodiments should not be construed as limiting the areas of application of the invention and that any changes and modifications are possible, provided that these changes and modifications do not depart from the scope of the attached patent claims. Thus, compounds mentioned for parts (A) and (B) were given only as examples, and other amino-reactive components, amino-containing components, blowing agents, and additives can be used. The apparatuses for carrying out the method can widely vary provided they are equipped with an intermediate chamber and control of the process optimization parameter.

Moreover, other implementations of the invention will be apparent to those skilled in the art from consideration of the specification and practice of the invention disclosed herein. Various aspects and/or components of the described embodiments may be used singly or in any combination in the systems and methods for providing information to the operators of vehicles, vessels and aircraft. It is intended that the specification and examples be considered as exemplary only, with a true scope and spirit of the invention being indicated by the following claims.

What is claimed is:

1. An information indication system for a vehicle, a vessel or an aircraft, the information indication system configured to indicate a value of a physical parameter to an operator of the vehicle, vessel or aircraft, the information indication system comprising a physical dial corresponding to a range of values of the physical parameter and a physical needle operable to move about the dial, wherein a current location of the needle on the dial indicates the value of a physical parameter within the range of values of the physical parameter, wherein the information indication system is configured to illuminate a portion of the dial in the immediate vicinity of the current location of the needle on the dial.

2. The information indication system of claim 1, wherein the illumination of the portion of the dial in the immediate vicinity of the current location of the needle on the dial is performed using a light source configured to move together with the needle.

3. The information indication system of claim 2, wherein the light source is an light emitting diode (LED).

4. The information indication system of claim 1, wherein the light source is an LED mechanically attached to the needle.

5. The information indication system of claim 1, wherein the information indication system is a speedometer of the vehicle, vessel or aircraft.

6. The information indication system of claim 1, wherein the information indication system is a tachometer of the vehicle, vessel or aircraft.

7. The information indication system of claim 1, wherein the illumination is an additional illumination, in addition to a base illumination of the dial.

8. The information indication system of claim 1, wherein a color of the illumination is different from a color of a base illumination of the dial.

9. The information indication system of claim 1, wherein the needle is illuminated together with the portion of the dial in the immediate vicinity of the current location of the needle on the dial.

10. A vehicle, a vessel or an aircraft comprising an information indication system configured to indicate a value of a physical parameter to an operator of the vehicle, vessel or aircraft, the information indication system comprising a physical dial corresponding to a range of values of the physical parameter and a physical needle operable to move about the dial, wherein a current location of the needle on the dial indicates the value of a physical parameter within the range of values of the physical parameter, wherein the information indication system is configured to illuminate a portion of the dial in the immediate vicinity of the current location of the needle on the dial.

11. The vehicle, vessel or aircraft of claim 10, wherein the illumination of the portion of the dial in the immediate vicinity of the current location of the needle on the dial is performed using a light source configured to move together with the needle.

12. The vehicle, vessel or aircraft of claim 11, wherein the light source is an light emitting diode (LED).

13. The vehicle, vessel or aircraft of claim 11, wherein the light source is an LED mechanically attached to the needle.

14. The vehicle, vessel or aircraft of claim 10, wherein the information indication system is a speedometer of the vehicle, vessel or aircraft.

15. An information indication system for a vehicle, a vessel or an aircraft, the information indication system configured to indicate a value of a physical parameter to an operator of the vehicle, vessel or aircraft, the information indication system comprising a physical dial corresponding to a range of values of the physical parameter and a physical needle operable to move about the dial, wherein a current location of the needle on the dial indicates the value of a physical parameter within the range of values of the physical parameter, wherein the information indication system is configured to illuminate a portion of the dial in the immediate vicinity of the current location of the needle on the dial and wherein the illumination of the portion of the dial in the immediate vicinity of the current location of the needle on the dial is performed using an light emitting diode (LED) light source rigidly attached to the needle and configured to move together with the needle.

* * * * *